UNITED STATES PATENT OFFICE.

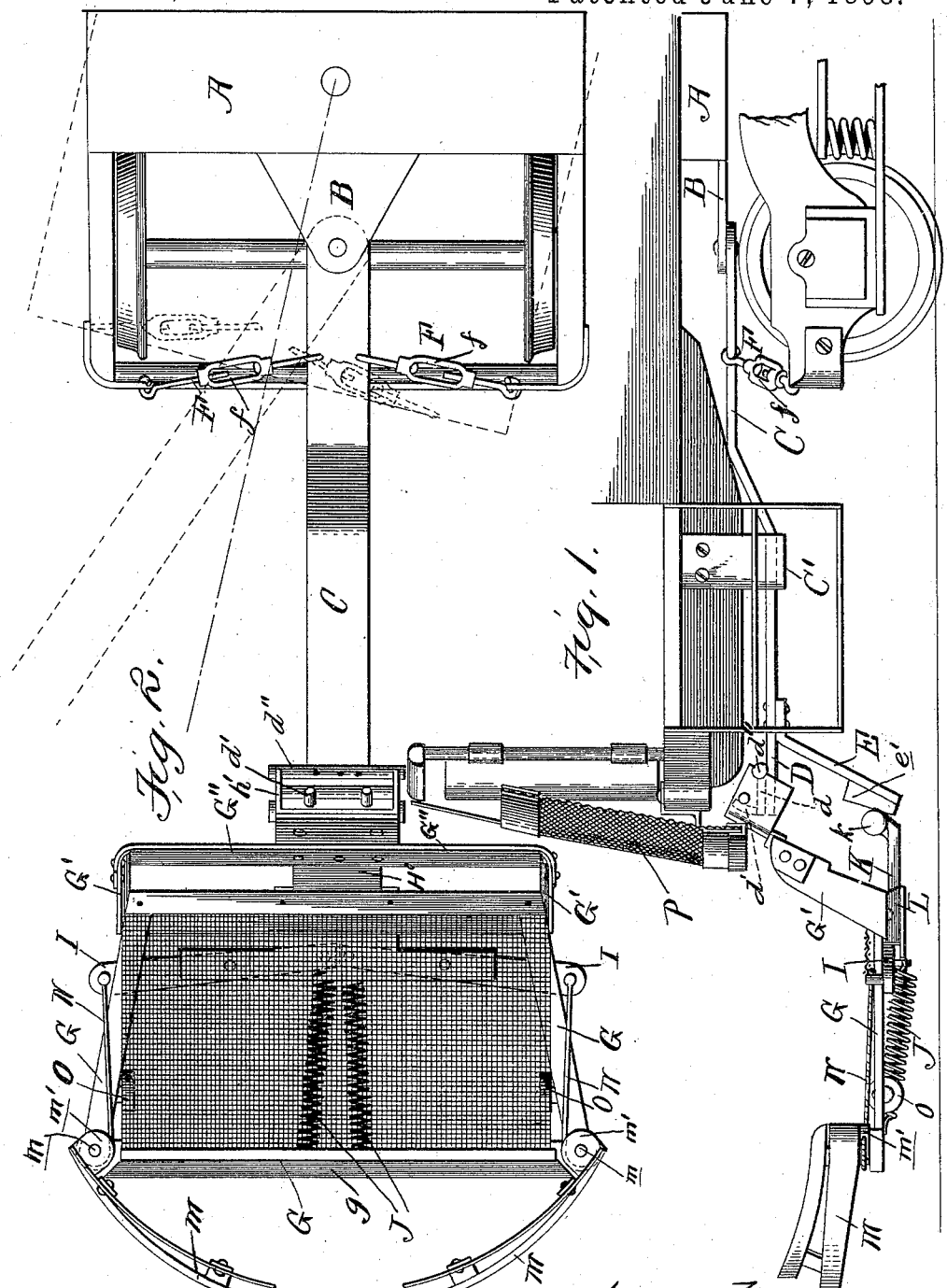

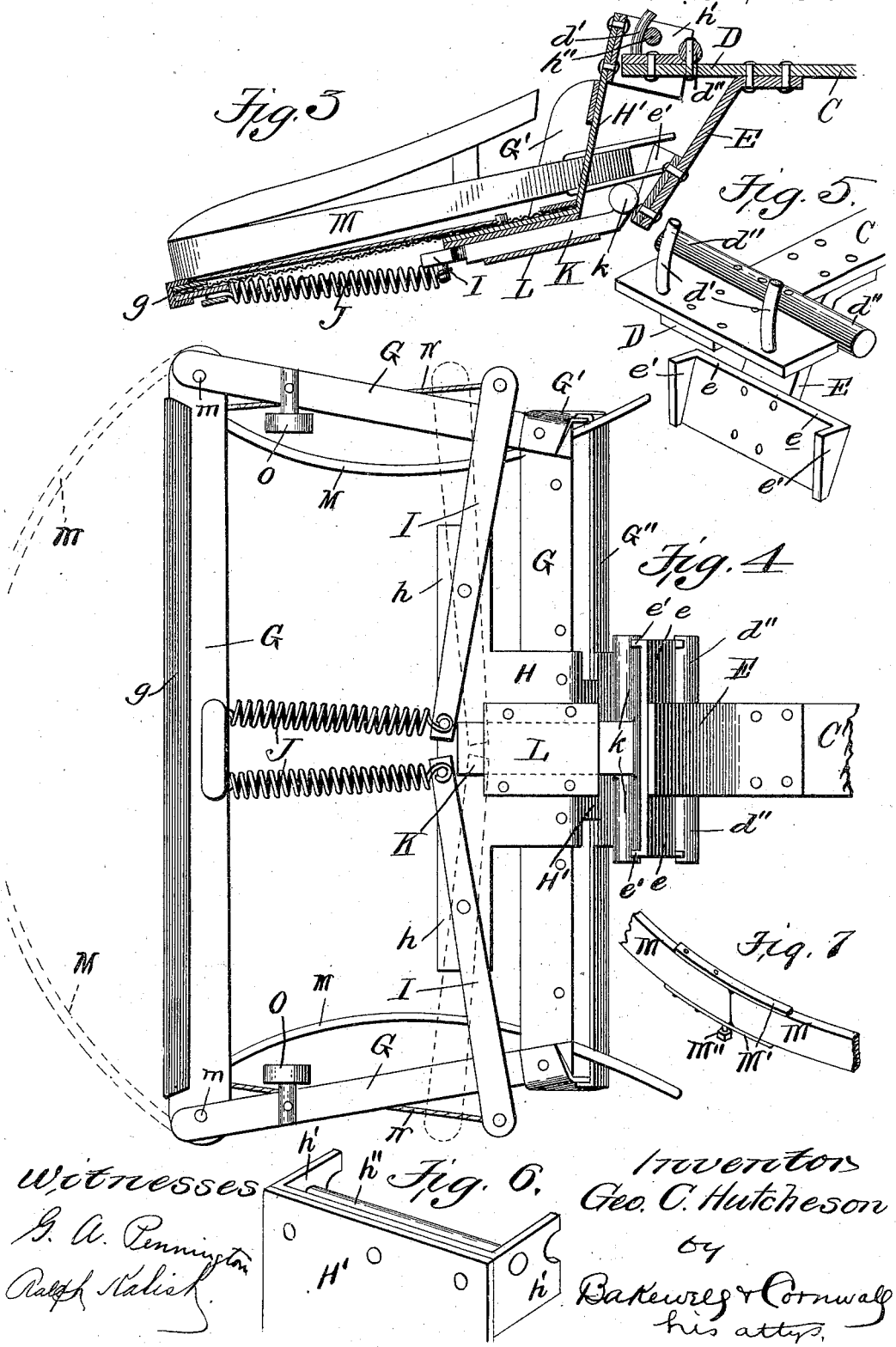

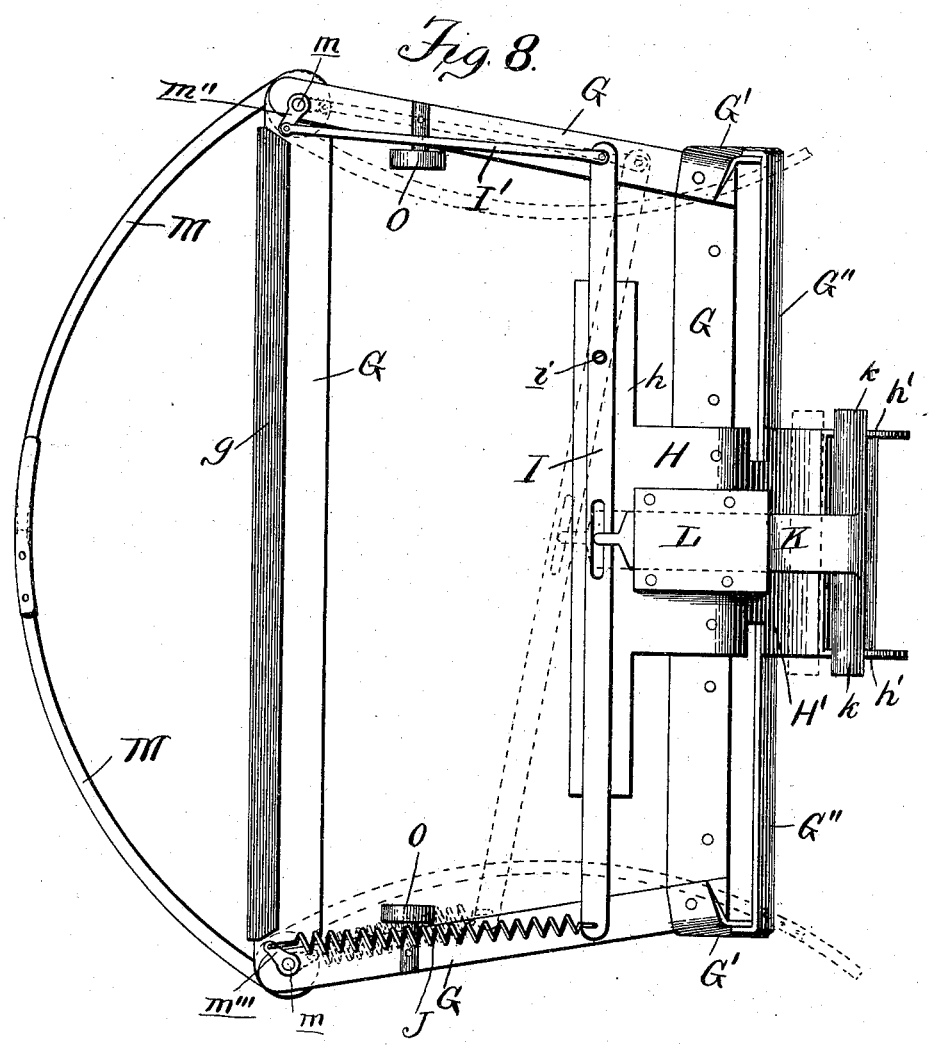

GEORGE C. HUTCHESON, OF ST. LOUIS, MISSOURI, ASSIGNOR, BY MESNE ASSIGNMENTS, OF ONE-HALF TO J. REED ELLIOTT, OF SAME PLACE.

CAR-FENDER.

SPECIFICATION forming part of Letters Patent No. 605,284, dated June 7, 1898.

Application filed October 7, 1897. Serial No. 654,433. (No model.)

*To all whom it may concern:*

Be it known that I, GEORGE C. HUTCHESON, a citizen of the United States, residing at the city of St. Louis, State of Missouri, have invented a certain new and useful Improvement in Car-Fenders, of which the following is a full, clear, and exact description, such as will enable others skilled in the art to which it appertains to make and use the same, reference being had to the accompanying drawings, forming part of this specification, in which—

Figure 1 is a side elevational view of my improved fender, showing the same in its elevated position and the manner of mounting the same upon a car. Fig. 2 is a top plan view. Fig. 3 is a cross-sectional view through my improved fender, showing the same in its dropped position. Fig. 4 is a view looking from beneath, showing the position the parts assume when the fender is dropped in full lines and in dotted lines the raised position. Fig. 5 is a detail view of the supporting means. Fig. 6 is a detail view of the fender-bracket for coöperating with the supporting means. Fig. 7 is a detail view showing the position the trip-arms assume when extended and coöperating to hold the elevating mechanism in its set position. Fig. 8 is a view looking from the under side of the fender, showing a slightly-modified form of elevating mechanism.

This invention relates to a new and useful improvement in fenders for street-railway cars and other vehicles.

The objects of the invention are to provide a fender which is normally held in a position slightly elevated above the track or roadway, with a trip-actuating device forward of the fender, which when struck by an object in its path operates to release the elevating mechanism to automatically and instantaneously drop the forward end of the fender to the rails before the fender contacts with the object; to provide simple and effective mechanism for holding the fender in its elevated position, which mechanism when released by the trip acts quickly and positively to permit the fender to drop; to so construct the fender that it may be readily and quickly attached to and detached from the car and transferred from either end of the car to the other, as may be desired; further, to so mount the fender that when the car goes around a curve the fender will follow the track instead of swinging to the outside, as do fenders now in general use, and, finally, other features of invention reside in the construction, arrangement, and combination of parts, all as will hereinafter be described and afterward pointed out in the claims.

In the drawings, A indicates a cross-beam secured to the under side of the car, and B a supporting-bracket projecting forward to the cross-beam and secured thereto in any suitable manner.

C indicates what I shall term the "fender-supporting tongue," which is pivotally secured at one end to the bracket B, while on its opposite end are formed extensions D and E. (More clearly shown in Fig. 5.) Extension D is provided with wings $d$, on which are formed curved projections $d'$, to the rear of which are cylindrical projections $d''$. Projections $d'$ and $d''$ coöperate to pivotally support the fender, as will presently be set forth.

Extension E is formed with wings $e$, the ends of which are upturned to form flanges $e'$ for coöperating with a portion of the fender-elevating mechanism, as will also be presently described.

C' indicates a bracket extending across the bottom of the car, upon which the forward portion of the tongue C is supported and permitted a free lateral movement.

F indicates links connecting the tongue C with the forward end of the truck-frame. These links may be adjusted through the medium of turnbuckles $f$, as is obvious.

The "fender-basket," as it may be termed, consists of a suitable base-frame G and suitable fabric, preferably wire mesh. The forward section of frame G, as well as other portions of the frame which are liable to contact with a person picked up by the fender, may be suitably padded with rubber or other suitable material, as shown at $g$.

At the rear of the base-frame on each side of the fender are formed uprights G', which are connected by a cross-bar G''. Secured to the cross-bar G'' and the rear section of the base-frame G is a plate H, provided with winged extensions $h$, to which are pivoted the levers of the elevating mechanism, while to the rear there is formed an upward extension H', from which extend wings or offsets $h'$, formed with notches in their ends, adapted to coöperate with the projections $d''$ on tongue C.

$h''$ indicates a cross-bar connecting the offsets $h'$ and adapted to engage the curved projections $d'$. The foregoing parts $h'\ h''$, when coöperating with projections $d'$ and $d''$, form the pivotal support for the fender.

I indicates levers pivoted to the winged extensions $h$ on the under side of the fender-frame. The inner ends of these levers are connected to springs J, the tendency of which is to draw the inner ends of said levers forward away from a sliding block K. This sliding block K moves in a suitable pocket L and is provided on its outer or rear end with rounded projections $k$, adapted to bear against the projections $e'$ on extension E of tongue C, so that when the inner ends of levers I are moved backward against the sliding block K the forward end of the fender is elevated by reason of the fender being caused to swing upwardly on its pivotal support, due to the backward movement of the sliding block against the extension E.

The trip which holds the elevating mechanism when the fender is set in its normal raised position comprises two swinging arms M, which also serve as a leverage to rock the levers I when it is desired to raise the fender from the rails.

Swinging arms M are pivoted on the upper side of the framing of the fender at $m$ and are formed with rounded pivot-blocks $m'$, to which are secured the ends of chains or cords N, the opposite ends of which are secured to the outer ends of levers I.

To raise the fender, arms M are swung outwardly, as shown in Figs. 1 and 2 and in dotted lines in Fig. 4, and through the medium of the connection with the outer ends of levers I said levers are rocked on their pivots, causing their inner ends to be thrown backward against the sliding block K, which, bearing against projection E, causes the fender to swing upwardly, as above described.

Arms M are moved outwardly until their ends meet, as shown more clearly in Fig. 7, where, owing to their curved form, they act upon the principle of an arch and are thereby held against inward movement by the tension of springs J, which exert substantially equal pulls on each arm and tend to draw said arms rearwardly through the medium of the levers I and cords or chains N. These arms are thus held in this position notwithstanding the usual vibrations of the fender while the car is in transit; but as soon as an object is suddenly struck by either of the arms the arm so struck will be displaced or tripped, and both arms being thereby released from engagement with each other swing quickly backward, the springs J become free to act, and the elevating mechanism is released, thus automatically dropping the fender before it comes in contact with the object struck by the trip, the positions the parts assume in this instance being clearly shown in full lines in Fig. 4.

To insure against the arms M becoming disengaged by reason of the vibration of the fender, I prefer to arrange spring-forks M' on the end of one of said arms, between which forks the end of the other arm is adapted to fit. The spring-forks may be formed with slightly-raised ribs or projections to coöperate with converse depressions in the edges of the other arm, and a screw M" may be employed to regulate the tension of the spring-forks, as is obvious.

In Fig. 8 I have shown a slightly-modified form of elevating mechanism. In this instance I dispense with one of the levers I and also utilize but one spring J. Lever I is pivoted at $i$ at a point between its center and one end. From the pivot end of lever I is connected a link or rod I', whose other end is connected to a bell-crank lever $m''$, connected to one of the arms M. The opposite end of lever I is connected to a bell-crank lever $m'''$ on the other arm M through the medium of spring J.

It will be seen from the above that when the arms M are in the position shown in full lines in Fig. 8 the elevating mechanism is held in its set position. When the trip is released, the elevating mechanism will quickly drop the fender, the parts assuming the positions shown in dotted lines. A slot-and-pin connection may be made between sliding block K and lever I, as shown; but it is obvious that the sliding block can have an independent movement, as shown in the other form.

Suitable wheels or rollers O may be employed, as shown, upon which the forward end of the fender may ride when in its dropped position, and I also prefer to provide a supplemental fender P, which may be detachably secured in front of the dashboard above the fender proper. This fender serves to prevent a person from contacting with the buffer-block, coupling, or other device which might project in front of the car-platform.

I will now describe how my fender is caused to follow the track when the car is going around a curve. Assuming that the truck has passed onto the curve and has assumed the position relative to the body of the car, as shown in dotted lines in Fig. 2, the end of supporting-tongue C is pivotally connected to bracket B, stationarily mounted upon the body of the car, which pivot-point is somewhat in advance of the pivot-point of the truck. Tongue C is also connected at a point in advance of its pivot to the truck-frame. When the truck follows the line of the curve, it of course turns relative to the body of the car, and the pivot-point of the fender-support being in advance of the pivot of the truck and fixed relative to the body of the car there is a shorter leverage, and hence the fender which projects considerably in front of the truck will be thrown past the line of travel of the truck and directly above the track.

The points of attachment of the rods F to the tongue C will of course be determined by the relation of the pivotal point of said tongue to the king-bolt of the truck, taking into consideration also the distance of the fender-basket in advance of its swinging center. This can easily be determined, thus rendering my fender readily attachable to street-cars of various builds. The bracket C' extends practically across the under side of the platform and serves to support the forward end of tongue C and its carried fender-basket, but said supporting-bracket C' does not in any way interfere with the lateral movement of said tongue.

I do not wish to be understood as limiting myself to the exact construction shown, as I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent, is—

1. The combination with a car-body and its truck, of a support connected to said car-body and truck so as to swing laterally when the car is going around a curve, a fender pivotally mounted on the front end of said support and movable therewith, mechanism for holding said fender in an elevated position, and a trip arranged in advance of the fender for releasing the same and permitting it to drop when the trip strikes an object, substantially as described.

2. The combination with a fender, of a suitable support to which the same is pivoted, means on the fender for engaging said support at its lower end for holding the fender in an elevated position, a lever operatively connected with said elevating mechanism, a swinging arm projecting out in front of the fender in its normal position, and a connection between said swinging arm and said lever; substantially as described.

3. The combination with a fender of a suitable support to which the same is pivoted, means on the fender for engaging said support at its lower end, for holding the fender in an elevated position, a lever operatively connected with said elevating mechanism, a swinging arm projecting out in front of the fender in its normal position, a connection between said arm and said lever, and another swinging arm coöperating with the free end of said first-mentioned swinging arm for holding the same in position; substantially as described.

4. The combination with a fender, of a suitable support upon which said fender is pivotally mounted, a movable piece arranged on the bottom of the fender and engaging the lower end of said support, levers for holding said movable piece against the support to elevate the fender, spring for retracting said levers, two arms pivotally mounted on the front outer edge of the fender, one of said arms having spring-jaws on its end for engaging the end of the other arm, and connections between said arms and levers; substantially as described.

5. The combination with the fender-support comprising the brackets D and E, the former of which consists of pivot projections $d''$, a laterally-extending plate $d$ and curved studs $d'$ on said plate, the latter comprising lateral wings having flanged edges $e'$, of a fender carrying a bracket H', which bracket is provided with side bearing edges $h'$ and a bar $h''$, said parts coöperating with the bracket D and its associate parts, and a sliding piece K having the bearing-pieces $k$ for coöperating with the wings $e'$ on the bracket E, and a lever or levers for engaging the said piece K, substantially as described.

6. The combination with the car-body, of a pivoted truck arranged thereunder, a fender-carrying tongue pivoted on the car-body in advance of the pivotal point of the truck, and a connection between said pivoted truck and said fender-carrying tongue, substantially as described.

7. The combination with a car-body, of a tongue C pivoted thereon, a fender-basket carried at the front end of the tongue, a truck pivotally mounted on the car-body back of the pivotal point of the tongue C, and a connection or connections between said pivotal tongue and the forward end of the truck, said connection including turnbuckles, substantially as described.

In testimony whereof I hereunto affix my signature, in the presence of two witnesses, this 16th day of September, 1897.

GEORGE C. HUTCHESON.

Witnesses:
G. A. PENNINGTON,
HUGH K. WAGNER.